April 20, 1954 B. ROBERTS 2,676,022

MAGNETIC RECORDING

Filed March 17, 1949 4 Sheets-Sheet 1

INVENTOR.
BRUCE ROBERTS
BY Lyon & Lyon
ATTORNEYS

INVENTOR.
BRUCE ROBERTS
BY Lyon & Lyon
ATTORNEYS

INVENTOR.
BRUCE ROBERTS
BY Lyon & Lyon
ATTORNEYS

MAGNETIC RECORDING

Filed March 17, 1949

INVENTOR.
BRUCE ROBERTS
BY
Lyon & Lyon
ATTORNEYS

Patented Apr. 20, 1954 2,676,022

UNITED STATES PATENT OFFICE 2,676,022

MAGNETIC RECORDING

Bruce Roberts, Los Angeles, Calif., assignor to Ernest G. Van Leeuwen and Alfred W. Neely, both of Los Angeles, Calif.

Application March 17, 1949, Serial No. 81,983

5 Claims. (Cl. 274—4)

The present invention relates to an improved recording and reproducing machine.

It is desirable to be able to manufacture recording and reproducing apparatus in the minimum amount of time and inexpensively, with a minimum number of parts which may be conveniently manufactured and assembled by relatively unskilled personnel, to form a compact light device which is foolproof and may be operated with a minimum amount of instruction.

It is therefore an object of the present invention to provide an improved recording and reproducing device which meet these desiderata.

Another object of the present invention is to provide an improved recording and reproducing device which is of small physical dimensions but yet allows the recording and reproduction of intelligence for a relatively long period of time without the necessity of changing the sensitized medium.

Another object of the present invention is to provide an improved reproducing and recording device of a type in which a magnetic tape is mounted to run in alternately opposite directions past an electromagnetic device controlled by electric impulses for making a plurality of magnetic record tracks on the tape, and wherein means are provided for automatically reversing the movement of the tape at the end of a record track and for shifting the electromagnetic device laterally of the tape when the tape is reversed in direction, a characterizing feature of the present invention being that the tape is always driven by a nonreversible constant speed motor driven shaft in a manner as to minimize the time interval necessary to move the recording device from one track to the next adjacent track at the end of a record track.

Still another object of the present invention is to provide an improved recording and reproducing device of the type described in the next preceding paragraph characterized in that a novel drive is provided which is automatically and selectively operated to alternately drive either one of two tape drums by a single nonreversible constant speed motor driven shaft.

Yet another object of the present invention is to provide an improved recording and reproducing apparatus of the type described above, characterized in that a novel means is provided for moving the electromagnetic device to different channels.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

The recorder and reproducer is characterized by its relatively small dimensions accomplished to a large extent by the use of a relatively wide magnetic tape 10 upon which series of recordings may be made generally along the lines 11, 12, 13, 14, etc., such recordings being made and reproduced when and as the tape 10 travels alternately in opposite directions, as indicated by the arrows 11A, 12A, 13A and 14A. These lines 11, 12, 13 and 14 may be termed record tracks.

An important feature of the present invention is the magnetic mechanism whereby the recording and reproducing head or electromagnetic transducer or device 20 is automatically dropped down to the next channel, and simultaneously the directions of rotation of the tape drums 21 and 22 are reversed at the end of a channel or record track; or, in other words, when the tape 10 is almost completely reeled off one of the drums 21, 22, as the case may be.

Figures 1, 2:
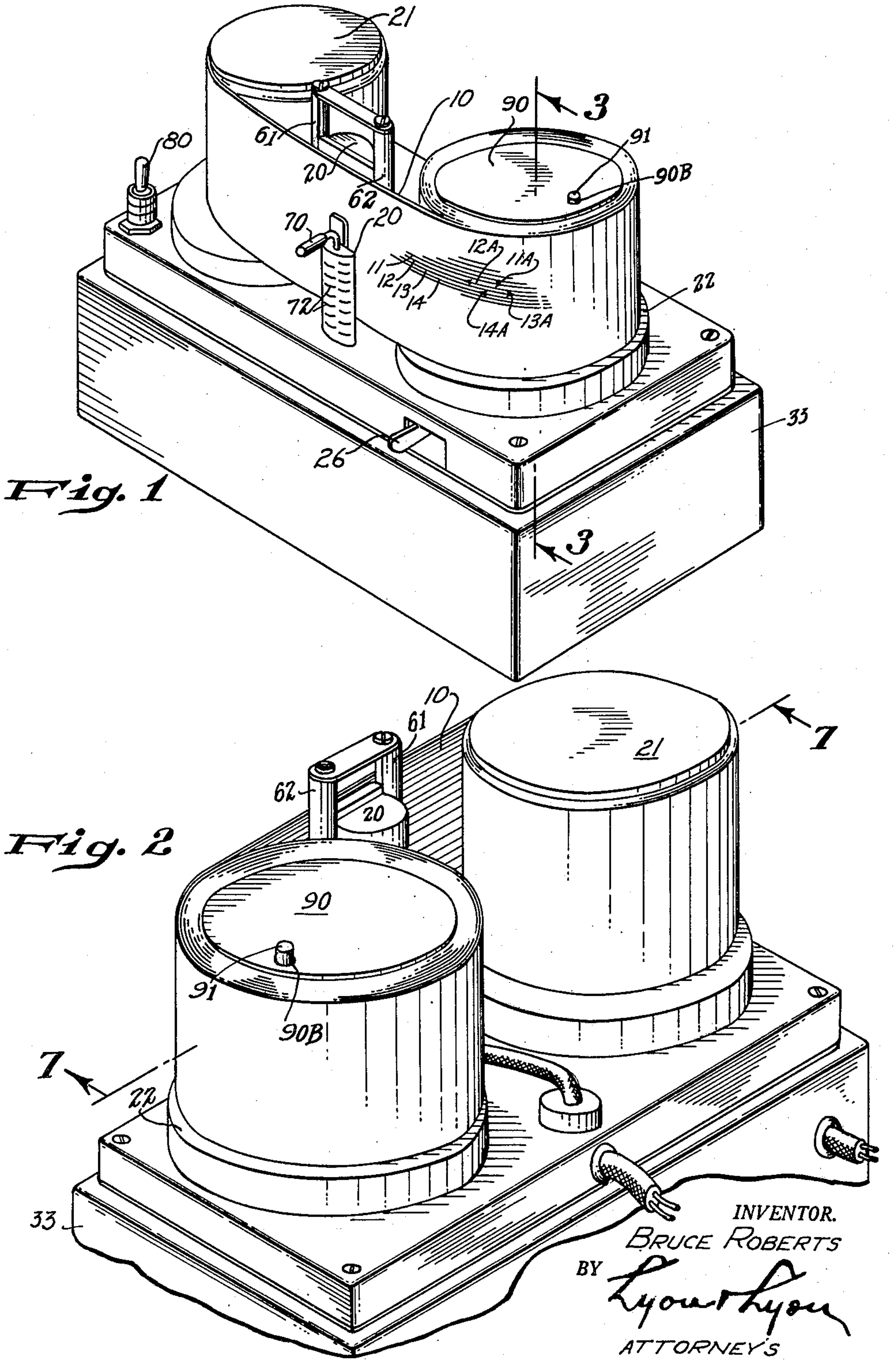
Figure 1 is a perspective view of a recording and reproducing apparatus embodying features of the present invention.
Figure 2 is a perspective view of the back of the apparatus shown in Figure 1 but with the metallic shield removed from the electromagnetic transducer.
Figures 8, 9, 10, 11, 12:
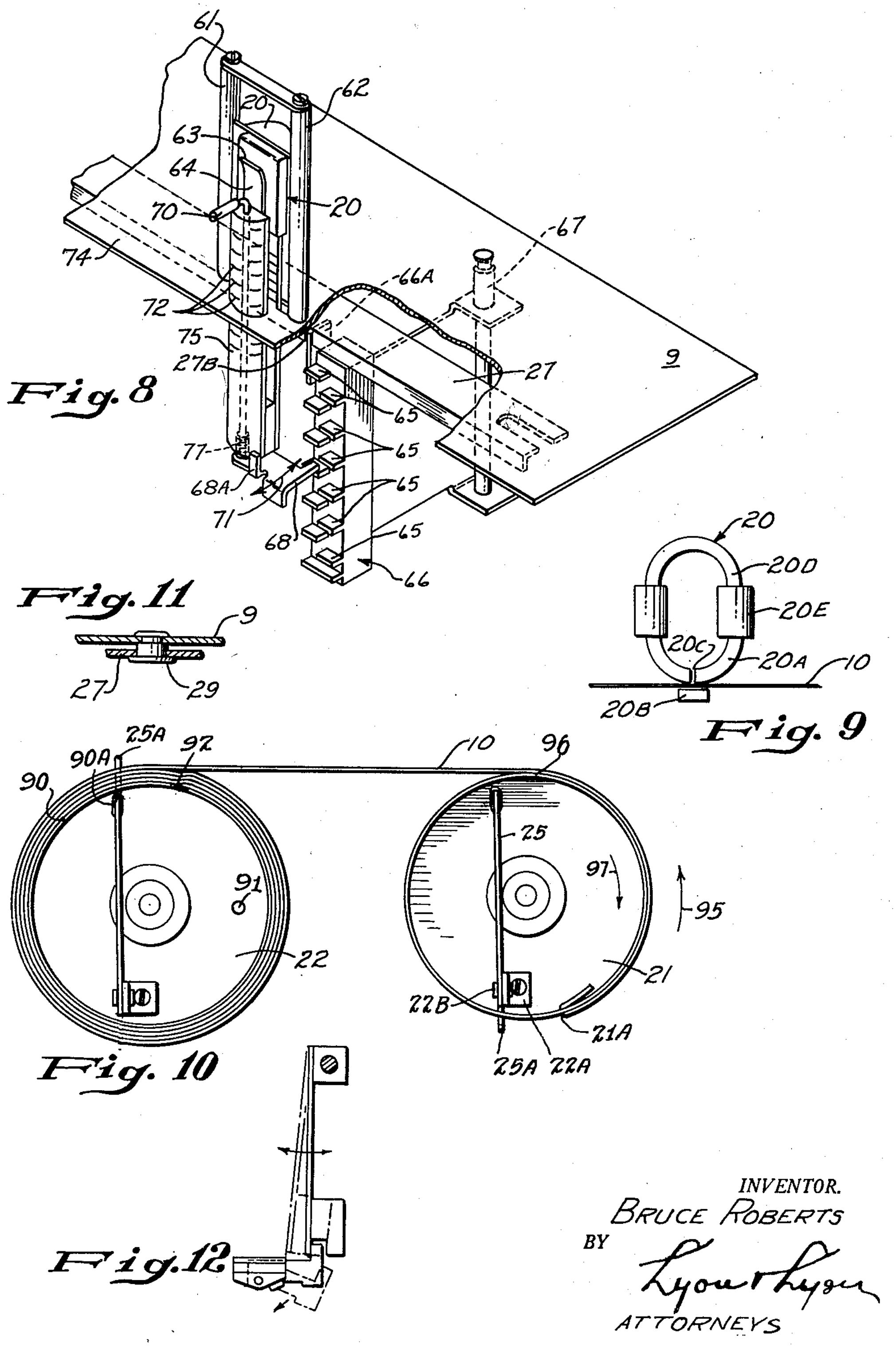
Figure 8 is a perspective view showing details of the electromagnetic transducer positioning apparatus embodied in the device shown in Figure 1.
Figure 9 is a diagrammatic representation for illustrating the disposition of the parts of the electromagnetic transducer in relationship to the magnetic tape passing adjacent thereto.
Figure 10 is a diagrammatic representation showing the manner in which the magnetic tape is reeled on the two tape drums.
Figure 11 is a sectional view taken substantially on the line 11—11 of Figure 5.
Figure 12 is another sectional view illustrating details of the apparatus shown in Figure 1.

The tape 10 is threaded and maintained on the drums 21, 22 as indicated in Figures 1 and 10, and is adapted to travel between the magnetically cooperating parts 20A, 20B (Figure 9)

of the electromagnetic transducer 20. The electromagnetic transducer 20 may be of the type which may be used both for recording and reproducing, wherein the tape 10 travels past the air gap 20C in the horseshoe type of magnetic field structure 20D, having mounted thereon the current coils 20E for producing a magnetic flux between the air gap 20C and the plate 20B. Plate 20B is of magnetic material.

Of course, it is understood that the electromagnetic transducer 20 may take other forms and shapes, and the particular one shown in Figure 9 is merely exemplary of those which may be used, it being noted that the electromagnetic transducer per se forms no part of the present invention, and in the actual transducer shown in Figure 8 the paper is inserted between the plates 63 and 64. The upper end of plate 64 is curved to form a lip whereby the tape 10 may conveniently be placed between the two plates 63, 64.

This electromagnetic transducer 20 is movable in a vertical plane in guide grooves in the spaced standards 61, 62 in the manner described hereinafter.

Figures 3, 4:
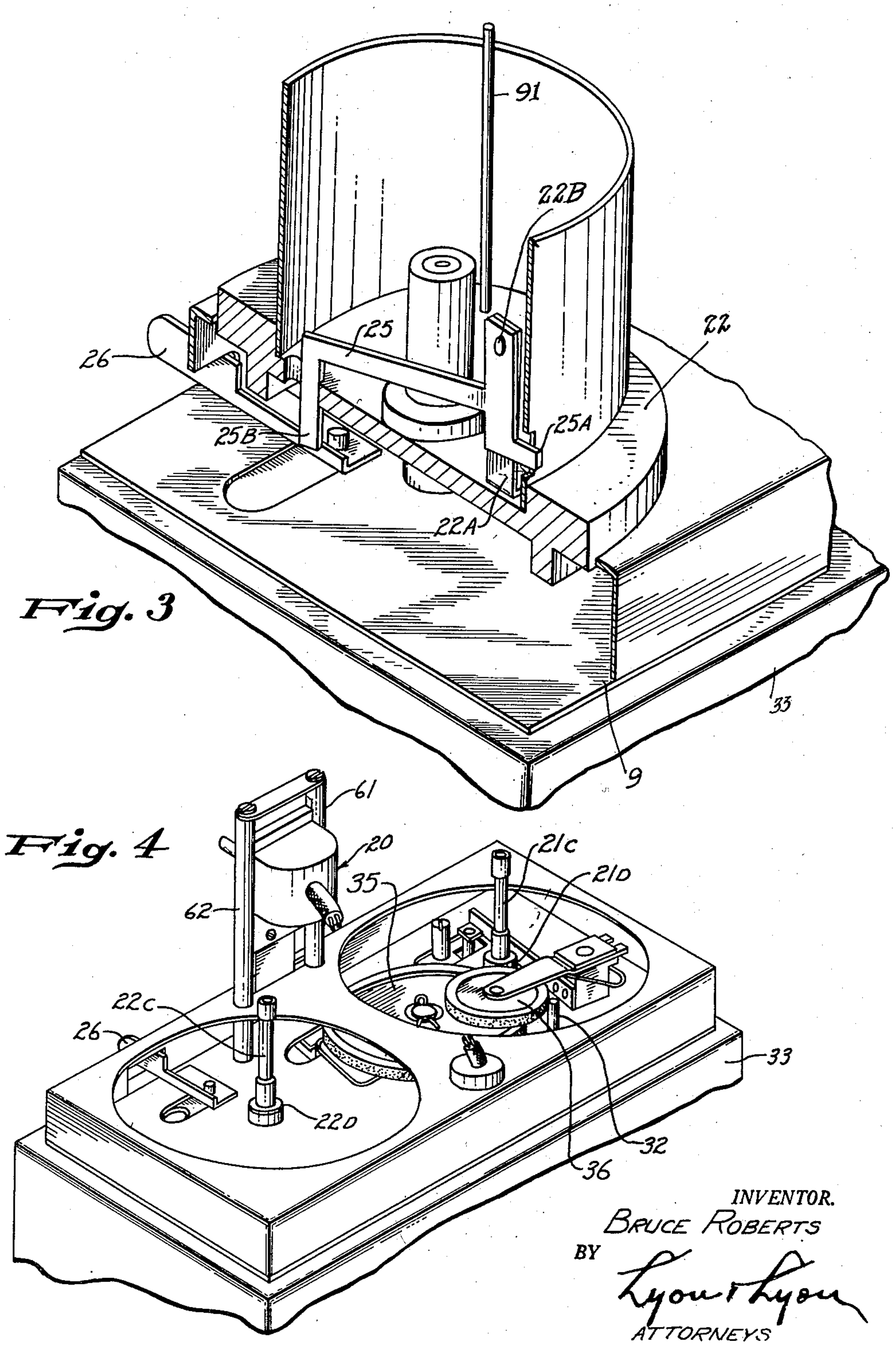
Figure 3 is a combined perspective and sectional view taken substantially on the line 3—3 of Figure 1.
Figure 4 is a perspective view similar to the perspective view shown in Figure 2, but with the magnetic tape and the tape drums removed.

Referring to Figure 3, each one of the drums 21, 22 carries internally thereof on bracket 22A a pivoted gravity actuated arm 25 which is pivoted at 22B with one of its ends 25A normally in engagement with the innermost tape turn on the corresponding drum, to thereby normally maintain the other end 25B in raised position. After substantially all of the tape is reeled from the drum 22, for example, the arm or dog 25B automatically drops to thereby allow it to engage and move the manually operable extension or lever 26 which is affixed to the slide or shuttle bar 27, which is movable longitudinally, as indicated by the arrows 28 in Figure 5. It is noted that the lever extension 25B in Figure 3 contacts the operating lever 26 whereas the other lever 25, pivotally mounted in the other drum 21, is adapted to engage and to move the extension 27B on the shuttle bar 27 to produce the same results.

Figure 5:
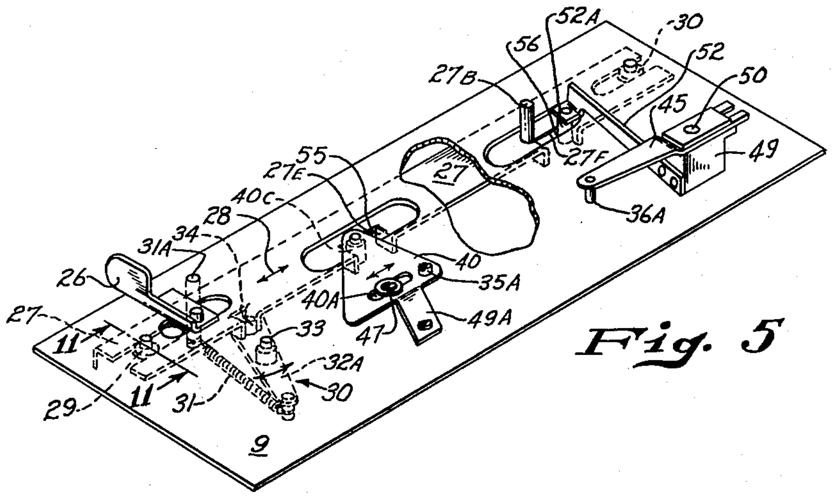
Figure 5 is a perspective view showing details of the over-centered shuttle bar and the lost motion connections between such shuttle bar and the axle supports for the pucks (not shown in Figure 5) which are used to drive alternately the corresponding tape drum.

Thus, as the drum 22 continues to rotate, near the end of a record track, the dog 25B mounted in either drum 21 or drum 22, as the case may be, causes the slide or shuttle bar 27 to move longitudinally, such motion of the bar 27 being guided by the combined supporting and guiding structures 29, 30 which are affixed to the mounting plate 9 in the manner indicated in Figure 11. The shuttle bar 27 is normally maintained in either one or its two extreme positions by the over-center mechanism 30, comprising the tension spring 31 and the lever 32A pivoted about the axis of the stationary pivot pin 33 which is mounted on the mounting plate 9, it being noted that one end of the spring 31 is fastened to the post 31A mounted on the plate 9, while the other end of the spring 31 is affixed to one of the free ends of the lever 32A. The other end of the lever 32A carries an abutment 34 which is snugly received in an aperture in the bar 27 provided by down-turned ears in the bar 27, as shown in Figure 5. Thus, the lever 32A is pivoted at a point intermediate its ends and serves to maintain, with the aid of the over-center spring 31, the shuttle bar 27 in either one of its two extreme positions.

Figure 6:
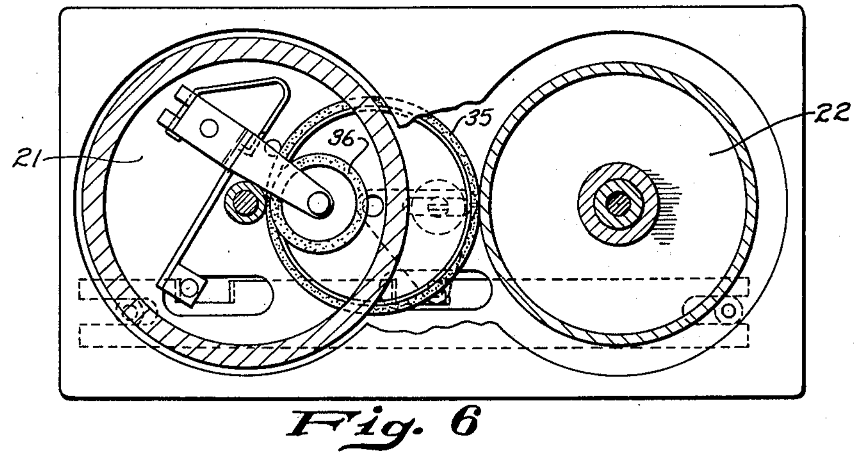
Figure 6 is a view taken substantially on the line 6—6 of Figure 7.
Figure 7:
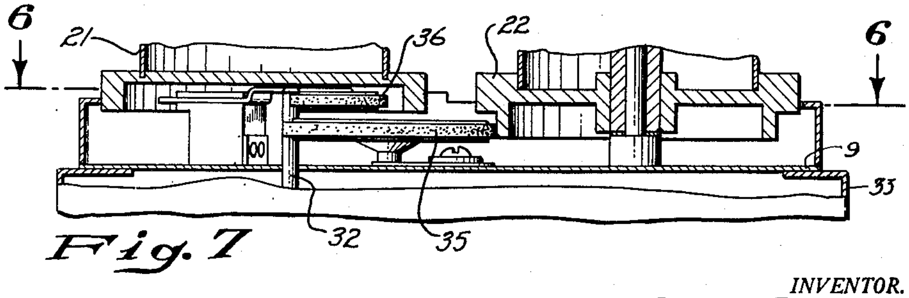
Figure 7 is a view taken substantially on the line 7—7 of Figure 2.

One of the tape drums 21, 22 is always in driving engagement with the constant speed nonreversible motor driven shaft 32 of a conventional phonograph type of motor mounted in the bottom of the case 33, with its shaft 32 projecting above the mounting plate, as shown in Figure 4. This motor driven shaft 32 is always oriented in the same direction, but the rubber rimmed driving wheels 35, 36, as the case may be, are automatically brought into engagement with the motor driven shaft 32, depending upon the position of the slide or shuttle bar 27. As indicated in Figures 6 and 7, the driving wheel or puck 35 is arranged to rotate the drum 22, and the other smaller driving wheel or puck 36 is arranged to move into engagement with the drive shaft 32 to drive the other drum 31. It is noted that at any one time, only one of the drums 21, 22 is driven and in such direction to reel and unreel the paper tape from one drum 21 to the other drum 22, and vice versa, and that when one of the drums 21, 22 is being driven by the shaft 32, the other is free to rotate in their mountings described presently.

The drums 21, 22 are rotatably supported on suitable anti-friction bearings which are mounted on the corresponding stationary posts 21C, 22C (Figure 4). The weight of the drums 21, 22 is carried on the corresponding anti-friction bearing members 21D, 22D. The drums 21, 22 may be moved vertically with respect to the stationary posts 21C, 22C, as for example, when such drums are assembled on or removed from their positions with respect to the posts 21C, 22C. The two drums 21, 22 together with the tape reeled on each may thus be removed from the device as a unit by simply pulling upwardly on the two drums 21, 22 simultaneously, in which case the tape 10 is free to slide between the two plates 63, 64 (Figure 8) of the transducer 20.

It is noted that the drums 21, 22 are somewhat different structurally in that, as shown in Figures 6 and 7, the drum 21 is provided with a circular flange adapted to be contacted internally by the driving puck 36, while the other drum 22 has a similar flange which is adapted to be contacted externally by the other driving puck 35. In order to assure a good driving connection, on the one hand between puck 36 and drum 21, and on the other hand between puck 35 and drum 22, the shafts for such rotatable driving pucks 35, 36 are floatingly supported with respect to the mounting plate 9, so as to allow such driving pucks 35, 36 to move in their respective planes of rotation. For this purpose, the shaft 35A for driving puck 35 is mounted on the triangular floating plate 40, and the shaft 36A, about which the other driving puck 36 rotates, is mounted on the arm 45 which is longitudinally slidable in the pivoted block 49, which in turn is pivoted about the axis of the pivot pin 50 affixed to the mounting plate 9.

The triangular plate 40 may pivot with respect to the stationary pivot pin 47 mounted on the mounting plate 9, or may slide with respect to the stationary pin 47 because of the enlarged slotted portion 40A therein through which the pin 47 passes. Such floating movement of the plate 40 is limited to a certain degree by the stationary stop member 49A, which is affixed to the mounting plate 9 but spaced a slight distance from the triangular plate 40.

Thus, the shafts 35A, 36A for the corresponding driving wheels or pucks 35, 36 respectively are floatingly mounted, i. e. the shafts 35A, 36A may move in either one of its radial directions in a horizontal plane. These shafts 35A, 36A are moved upon movement of slide plate 27 from one of its over-center positions to the other one of its over-center positions, it being noted, however, that the plate 40 and arm 52, attached to the pivotable block 49, are each coupled to the shuttle bar 27 through a lost motion connection represented generally by the reference numerals 55, 56. These lost motion connections 55, 56 are, as shown in Figure 5, obtained by providing suitably enlarged and spaced openings in the shuttle bar 27 into which an extension 40C and 52A respectively may extend. The openings 27E and 27F in the plate 27, into which the members 40C and 52A respectively extend, are of such dimensions that, in one of the over-center positions of the bar 27 the shaft 36A is moved to interposition its driving puck 36 between the motor driven shaft 32 and the corresponding drum member 21, to thereby establish a driving connection therebetween, while the member 40C is free to move in the slot 27E to, in turn, allow the associated driving puck 35 to move out of engagement with the corresponding drum 22. Similarly, in the other over-center position of the bar 27, the extension 40C is engaged between walls defining the slotted portion 27E to cause the associated driving puck 35 to move in a position between the motor driven shaft 32 and the corresponding drum 22, to establish a driving connection therebetween, while the other driving puck 36 is free to move out of driving engagement with its associated tape drum 22.

Thus, in one of its over-center positions the bar 27 is effective to establish a driving connection with the tape drums 21, 22, and in the other over-center position of bar 27 a driving connection is established with the other one of such tape drums 21, 22.

It is noted that the purpose of floating the supports for the shafts 35A, 36A is to allow the drive wheels 35, 36, as the case may be, to move into a more binding or locking engagement with the associated drum to provide a more positive driving connection to thereby prevent slippage.

The electromagnetic transducer 20 is vertically slidable in the guide slots in the two vertical stationary posts 61, 62 (Figure 8) with the magnetic tape disposed between the members 63, 64. The transducer 20 is normally maintained stationary while the tape is being reeled from one drum onto the other drum; but when subtantially all of the tape is removed from one of the drums the shuttle bar 27 is moved longitudinally to automatically allow the transducer 20 to move to the next lower channel or track on the tape 10. For this purpose, the transducer 20 is supported on one of a plurality of vertically disposed staggered steps 65 on the pivotally mounted post 66. The post 66 is mounted for pivotal movement about the axis of the stationary pin 67. This pivoted post 66 carries an extension 66A received in a notch 27B in the slide plate 27 so as to move with the slide plate 27.

Thus, when the post 66 is pivoted, the transducer 20 and attached support 68 are allowed to fall by the action of gravity forces thereon on to the next lower adjacent staggered step 65, in accordance with the movement of the shuttle bar 27. Thus, as the shuttle bar 27 is progressively oscillated, either by manually operating the lever 26, or automatically at the end of a record track by the gravity actuated dogs or levers 25 (Figure 3) associated with each one of the drums 21, 22, the transducer 20 is progressively lowered. This feature allows one to move the transducer 20 downwardly by manually operating the handle or lever 26 without the necessity of running the tape to the end of a record track.

Also, the transducer 20 may be moved upwardly manually without the necessity of running the tape by first rotating the handle 70 associated therewith clockwise in Figure 8, to thereby rotate the support 68 in the direction indicated by the arrow 71; and thereafter the transducer 20 may be moved up or down to a position wherein one of the indicia 72 is adjacent a reference mark provided, for example, by the upper edge of the mounting plate 9. For this purpose it is noted that the handle 70 comprises the end of a bent shaft which is rotatably supported in a half round rod 75 of transparent Lucite which is affixed to the plate 74, and which has the indicia 72. This handle 70 is attached to the support 68 which has an ear 68A extending upwardly therefrom to serve as a stop member for engagement with the Lucite 75, it being noted that such stop member 68A is normally biased in engagement with the Lucite 75 by the torque spring 77.

Preferably, the machine is loaded with tape mounted on a cylindrical spool 90, as shown in Figure 10, such spool having an apertured portion 90A through which the finger 25A is adapted to engage the innermost turn of the tape on the reel 90. Such reel 90 is closed at its upper end, as shown in Figure 1, and is adapted to slip over the drum 22. In order to properly orient such reel 90 with respect to the drum 22, and also to prevent such reel from slipping with respect to the drum 22, there is provided an indexing and holding pin 91 which is mounted on the base of the drum 22, as indicated in Figure 3, with such pin 91 adapted to project through an indexing aperture 90B in the upper closed end of the reel 90. Thus, when the reel 90, with the tape mounted thereon, is properly loaded onto the machine, with the pin 91 projecting through the aperture 90B, the slot 90A is properly oriented with the finger 25A to allow such finger 25A to project through the slot and engage the innermost tape turn.

The innermost tape turn on the reel 90 may be secured thereto by using different expedients and, as shown in the drawings, the end of such innermost tape turn is glued to the reel 90 as indicated at 92 in Figure 10. Preferably, such innermost tape end is affixed to the reel 90 as close as is practically possible to the slot 90A through which the finger 25A is adapted to project.

After the tape spool is thus loaded on the drum 22, the outer end of the tape is partially wound around the other drum 21 and inserted through the tape holding slot 21A therein, with the paper bent back upon itself as shown in Figure 10. The tape slot 21A is positioned in a definite relationship with respect to the tape engaging finger 25 associated with the drum 21 to obtain cinching action between the tape and the drum 21, to thereby prevent undue stressing of the tape where it passes through the aperture 21A to avoid tearing of the tape at that point.

Referring to Figure 10, the tape 10 is being reeled from the drum 21 onto the spool 90, and the drum 21 travels in the direction indicated by the arrow 95. This corresponds to the end of tape travel from drum 21 to the spool 90, and the mechanism is at the point of tripping so as to automatically cause the tape 10 to reverse its direction of travel with subsequent reeling of the tape from the spool 90 onto the drum 21. It is noted that at such point of tripping the paper 10 produces a cinching action with the circular drum 21 to prevent undue stressing of the tape at the aperture 21A. Preferably, the annular distance between the slot 21A and the point 96, under these conditions, at which the tape first engages the drum 21, is greater than ninety degrees measured in the direction indicated by the arrow 97.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. Apparatus of the character described, comprising a pair of record drum members arranged to alternatively transfer a record from one drum member to the other, a motor driven shaft, a single shuttle bar movable substantially rectilinearly, a corresponding driving puck member for each of said drum member, each puck member being alternately moveable into engagement with said motor driven shaft to thereby drive its corresponding drum member, said puck members being floatingly mounted and actuated by said shuttle bar for free movement in their planes of rotation into direct engagement with their corresponding drum member, and means operated automatically when substantially all of said record is transferred from one drum member to the other drum member to move said shuttle bar, said means being effective to move said shuttle bar in opposite directions to corresponding extreme positions wherein a corresponding one of said puck members is pressed into engagement with a respective one of said drum members.

2. In recording apparatus of the type in which a magnetic tape is mounted to run in alternately opposite directions adjacent an electromagnetic device energizable by electric current for making a plurality of magnetic record tracks on the tape, and wherein there is present means for automatically reversing the movement of said tape at the end of a record track and for shifting the device laterally of the tape when the latter is reversed, the improvement residing in providing a nonreversible constant speed motor driven shaft, a pair of drum members carrying said tape arranged to be alternately driven to thereby move said tape in said alternately opposite directions, a member movable to different positions, a pair of puck members floatingly supported on said member, each of said puck members being arranged for driving a corresponding drum member, each puck member being alternately moveable into engagement with said motor driven shaft to thereby drive a corresponding drum member, each of said puck members having a corresponding shaft support, a lost motion connection between said member and each of said shaft supports, a structure movable in accordance with said member having a plurality of vertically disposed staggered steps for supporting said electromagnetic device, said structure being movable in accordance with movement of said member to allow said electromagnetic device to move, under the influence of gravity forces, onto the next adjacent lower staggered step.

3. In recording apparatus of the type in which a magnetic tape is mounted to run in alternately opposite directions past an electromagnetic device energizable by electric current for making a plurality of magnetic record tracks on said tape, and wherein means are present for automatically reversing the movement of said tape at the end of a record track and for shifting said device laterally of the tape when the latter is reversed, the improvement residing in providing a pair of drums for said tape, a support for said drums, a member automatically movable on said support when said tape reaches the end of a record track, one of said drums having an internal driving flange and the other one of said drums having an external driving flange, a constant speed nonreversible motor driven shaft, a pair of driving pucks each arranged to drive a corresponding one of said drums, said driving pucks each having an axle support floatingly mounted on said support for movement in a plane substantially parallel to their corresponding planes of rotation, a lost motion connection between each axle support and said member, over-center positioning means associated with said member to maintain said member in either one of two positions wherein a corresponding one of said axle supports is moved to interposition its corresponding driving puck between said constant speed shaft and the corresponding flange on the corresponding drum.

4. The invention defined in claim 3 characterized by the fact that each drum carries a lever adapted to engage said member but normally maintained out of engagement therewith by the tape on the drum.

5. The invention defined in claim 3 characterized by the fact that said electromagnetic device is supported on one of a plurality of vertically disposed staggered step members, said plurality of step members being moved with said member to allow said electromagnetic device to drop down onto the next adjacent staggered step.

References Cited in the file of this patent

UNITED STATES PATENTS

| Number | Name | Date |
|---|---|---|
| 1,108,501 | Kirchhoff | Aug. 25, 1914 |
| 1,343,628 | Jenkins | June 15, 1920 |
| 1,366,182 | Hokanson | Jan. 18, 1921 |
| 1,560,721 | O'Reilly | Nov. 10, 1925 |
| 1,789,607 | Steurer | Jan. 20, 1931 |
| 1,814,706 | Karrer | July 14, 1931 |
| 1,971,028 | Bothe | Aug. 21, 1934 |
| 2,032,190 | Thomas | Feb. 25, 1936 |
| 2,275,961 | Heller | Mar. 10, 1942 |
| 2,408,320 | Kuhlik | Sept. 24, 1946 |
| 2,430,538 | Somers | Nov. 11, 1947 |
| 2,467,507 | Stone | Apr. 19, 1949 |
| 2,468,198 | Heller | Apr. 26, 1949 |
| 2,486,473 | Hart | Nov. 1, 1949 |
| 2,487,170 | Nygaard | Nov. 8, 1949 |
| 2,488,482 | Swarthout | Nov. 15, 1949 |
| 2,535,478 | Arndt | Dec. 26, 1950 |
| 2,610,808 | Davis | Sept. 16, 1952 |
| 2,614,760 | Danisch | Oct. 21, 1952 |

FOREIGN PATENTS

| Number | Country | Date |
|---|---|---|
| 390,878 | Germany | Feb. 25, 1924 |
| 392,641 | Great Britain | May 25, 1933 |
| 471,713 | Great Britain | Sept. 9, 1937 |
| 852,767 | France | Nov. 9, 1939 |